April 26, 1927.  E. O. PETERSON  1,625,907

PROCESS OF JOINING MATERIALS

Filed March 1, 1926

Inventor
Edwin O. Peterson
By Wm. F. Moore
Attorney

Patented Apr. 26, 1927.

1,625,907

UNITED STATES PATENT OFFICE.

EDWIN O. PETERSON, OF ELGIN, NEBRASKA.

PROCESS OF JOINING MATERIALS.

Application filed March 1, 1926. Serial No. 91,642.

My invention is an improved process of joining or connecting the edges of two materials together, and refers particularly to a process of connecting together the edges of leather or like flexible material with a transparent material, such as pyroxylin, celluloid or like material of a transparent nature.

The main object of my invention is the provision of a process which will insure the connection of the flexible and transparent materials in such a manner as to make a perfect joint or connection, thus producing an article which is particularly desirable as a case for wrist watches, transparent covering for boxes of different kinds and in fact for any purpose where it would be desired to attach a transparent material to a flexible material to form a cover through which the sight may penetrate.

Another object of my invention is the provision of a process which can be carried out with ease, facility and at small expense and which will produce an article which for many purposes will be thoroughly practical, desirable and useful.

In order that my process may be thoroughly understood and its advantages be appreciated I have shown in the accompanying drawings the device which I employ in carrying my process into effect, and in said drawings.

Figure 1:
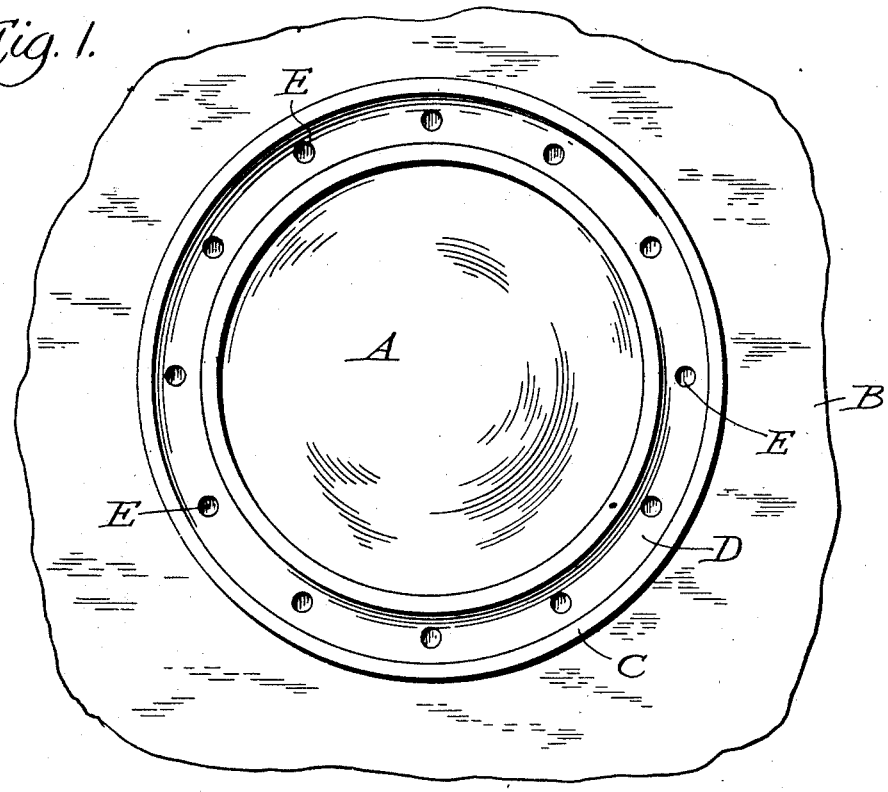
Figure 1 represents a top plan view of my device shown in the position it occupies in sealing or joining the edges of the transparent and flexible material.
Figure 2:
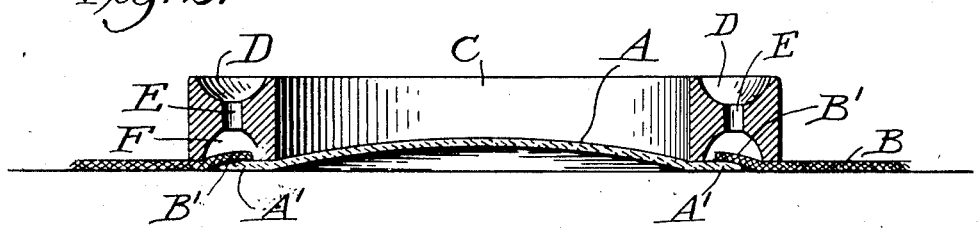
Figure 2 represents a central longitudinal sectional view thereof.
Figure 3:
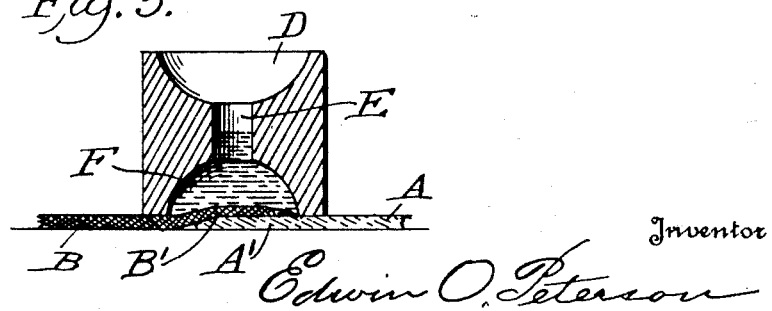
Figure 3 represents a detail view showing the application of the sealing medium.

In carrying my process into effect for the connection or joining of the edges of the transparent material A, with the leather or other flexible material B, I place over the edges A' and B', the ring C, which is formed with a groove or channel D, to receive the sealing material and with a series of passages E, which leads to the underchannel F, located above the edges A' and B', and in carrying my invention into effect I pour into the channel D a suitable chemical liquid G, which forms a perfect seal for the edges of the material by effecting the softening of the pyroxylin, celluloid, or other transparent material and when more pressure is applied to the ring the two materials are forced closely together and in a short time the sealing medium hardens and forms a perfect joint between the transparent and flexible materials.

The sealing medium must necessarily be a fluid which acts only on the pyroxylin or celluloid to effect the softening and permit a smooth perfect joint which in a short time hardens and makes a perfect seal between the edges of the two materials.

In the drawing is shown a circular ring but it will be understood that a ring or band of any shape may be used as circumstances desire, it only being necessary that the edges of the two materials be placed in overlapped position and sealed under pressure with a fluid which will first soften the edge of the transparent material and under pressure to retain the edges in intimate relation become hardened and make a perfect seal.

The process will prove a great saving in time, labor and expense and will prove desirable for many purposes where it is necessary to unite a transparent material to another or anchoring material, and particularly for use in making cases for wrist watches, boxes for fruit or articles of display, and in fact for many purposes too numerous to mention.

This invention will prove of particular advantage for sealing the edges of the transparent windows used in automobiles to the fabric of which the curtains are made.

It will be noted that the ends of the material which are to be joined overlap and pressure is brought to the sides of said edges, allowing said edges to be free and that this permits the chemical solvent to pass under said edges to dissolve the edges of the transparent material and form upon hardening a smooth and perfect seal or joint, which is the most important feature of my invention.

I claim:

1. The herein described process of uniting the edges of transparent and non-transparent material, consisting in placing the edges to overlap, applying a chemical solvent to said overlapped edges to dissolve the edges of the transparent material, applying pressure within a localized area adjacent the overlapping edges to retain them in intimate relation and to confine the chemical solvent within said localized area, and retaining the edges under pressure until the hardening of the seal is completed.

2. The device herein described for uniting the edges of two materials, consisting of a band to rest upon and retain the edges together having a series of openings to receive a sealing chemical.

In testimony whereof I hereunto affix my signature.

EDWIN O. PETERSON.